(12) United States Patent
Li et al.

(10) Patent No.: US 9,667,150 B2
(45) Date of Patent: May 30, 2017

(54) APPARATUS FOR CONTROLLING SURGE VOLTAGE IN DC-DC CONVERTER INCLUDING SNUBBER CIRCUIT

(75) Inventors: Zhe Li, Seoul (KR); Min Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 415 days.

(21) Appl. No.: 14/234,068

(22) PCT Filed: Jul. 23, 2012
(Under 37 CFR 1.47)

(86) PCT No.: PCT/KR2012/005870
§ 371 (c)(1),
(2), (4) Date: Sep. 2, 2014

(87) PCT Pub. No.: WO2013/012301
PCT Pub. Date: Jan. 24, 2013

(65) Prior Publication Data
US 2015/0124500 A1    May 7, 2015

(30) Foreign Application Priority Data

Jul. 21, 2011 (KR) .................. 10-2011-0072367
Jul. 19, 2012 (KR) .................. 10-2012-0079006

(51) Int. Cl.
*H02M 3/335* (2006.01)
*H02M 1/34* (2007.01)

(52) U.S. Cl.
CPC ....... *H02M 3/335* (2013.01); *H02M 3/33546* (2013.01); *H02M 2001/346* (2013.01); *Y02B 70/1491* (2013.01)

(58) Field of Classification Search
CPC ..... H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02J 3/38; H02J 3/461; H02J 3/46; Y02B 70/1491
See application file for complete search history.

(56) References Cited

U.S. PATENT DOCUMENTS

| | | | |
|---|---|---|---|
| 4,755,922 A | 7/1988 | Puvogel | |
| 5,032,970 A | 7/1991 | Telefus | |
| 6,128,206 A * | 10/2000 | Sun ................... | H02M 3/33592 363/127 |

(Continued)

FOREIGN PATENT DOCUMENTS

| | | |
|---|---|---|
| EP | 0284306 A2 | 9/1988 |
| JP | 01-303056 A | 12/1989 |

(Continued)

*Primary Examiner* — Jeffrey Gblende
(74) *Attorney, Agent, or Firm* — LRK Patent Law Firm

(57) ABSTRACT

Provided is an apparatus for controlling a surge voltage. An embodiment configures a snubber coil and a snubber rectifier on a secondary side circuit in series to control a high spike surge voltage across a rectifier on the secondary side. When the rectifier is turned-off, the snubber rectifier is turned-on for a predetermined time to control the surge voltage.

17 Claims, 3 Drawing Sheets

(56) References Cited

U.S. PATENT DOCUMENTS

| | | | |
|---|---|---|---|
| 6,381,108 B1 * | 4/2002 | Bisconti | H02M 3/33507 |
| | | | 361/18 |
| 6,956,748 B2 | 10/2005 | Nakagawa | |
| 2007/0268641 A1 * | 11/2007 | Kuo | H02H 7/1255 |
| | | | 361/90 |

FOREIGN PATENT DOCUMENTS

| | | |
|---|---|---|
| JP | 2002-320385 A | 10/2002 |
| JP | 2011-010463 A | 1/2011 |
| KR | 10-2009-0114015 A | 11/2009 |

\* cited by examiner

Fig. 3
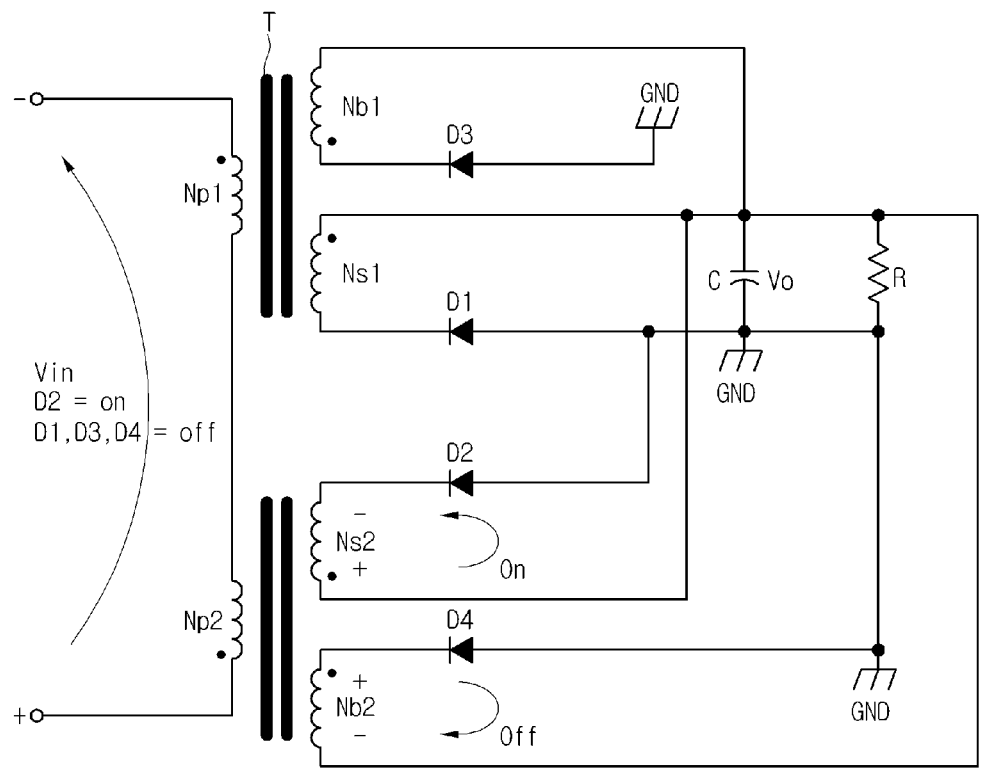
[Fig. 4]
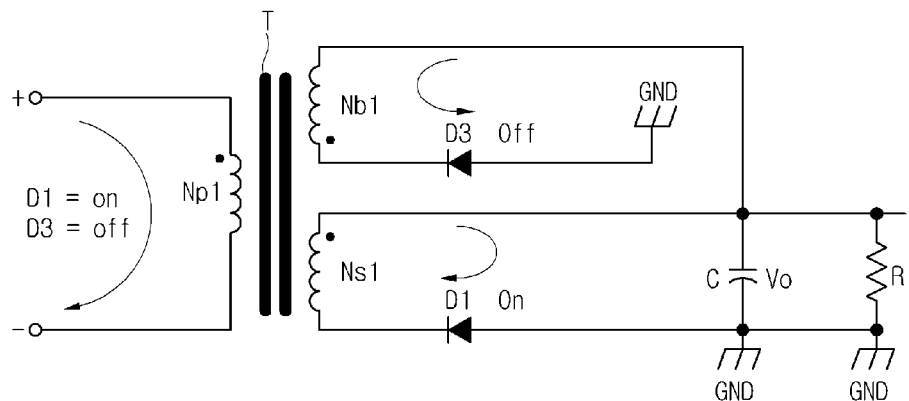

APPARATUS FOR CONTROLLING SURGE VOLTAGE IN DC-DC CONVERTER INCLUDING SNUBBER CIRCUIT

TECHNICAL FIELD

The present invention relates to an apparatus for controlling a surge voltage

BACKGROUND ART

In general, a DC-DC converter may be used when a DC voltage greater or less than an input voltage is required.

The DC-DC converter generates a high spike voltage across each switching devices on a secondary side during switching.

To solve this, in recent years, a snubbed circuit is applied to the DC-DC converter to remove the high spike voltage.

A conventional DC-DC converter is disclosed in Korean patent application No. 2008-0039762.

The conventional DC-DC converter will be described. In the conventional DC-DC converter, a resistor R and a capacitor connected in series are connected to switching devices on a secondary side.

However, the conventional resistor and capacitor have a problem in that they are limited to removal of the spike voltage in a DC-D converter for large power.

Further, because the snubbed circuit has a resistor, heat is generated by the resistor to deteriorate device characteristics and to reduce the life duration.

Meanwhile, because only a coil and a rectifier are configured on the secondary side, the conventional DC-DC converter may not control a spike surge voltage generated when the rectifier is turned-off.

Furthermore, since coils wound in the secondary side are respectively wound around cores, there are problems in cost increase and size side.

DISCLOSURE OF INVENTION

Technical Problem

The present invention has been made in view of the above problems, and provides an apparatus for controlling a high spike surge voltage applied across a rectifier or a switching device in a secondary side.

The embodiment provides an apparatus for controlling a surge voltage by serially configuring a snubbed coil and a snubbed rectifier in the secondary side.

The embodiment further provides an apparatus for controlling a surge voltage which has rectifiers configured on the secondary side functioning as a full wave rectifier.

In an embodiment, a rectifier functioning as the full wave rectifier selectively acts as a corresponding rectifier in response to a forward current and a reverse current.

The embodiment further provides a snubbed coil and a snubbed rectifier serving as a switch in each rectifier are serially connected to each other in a circuit configured as an full wave rectifier type on the secondary side.

In the embodiment, a rectifier device connected to a secondary side coil in series configures a snubbed coil and a snubbed rectifier connected to the secondary coil and the rectifier device in series in order to control a spike surge voltage generated when being turned-off.

The embodiment suggests such that a snubbed rectifier configured on the secondary side is momentarily turned-on to control a surge voltage when a rectifier configured in the secondary side is turned-off.

In the embodiment, when a coil is wound around a core, both of a coil and a snubbed coil on a secondary side are wound around one core.

In the embodiment, when a coil is wound around a core, both of coils and snubbed coils on a primary side and/or a secondary side are wound around one core.

Solution to Problem

In accordance with an aspect of the present invention, an apparatus for controlling a surge voltage, includes: an input power supply; a coil on a primary side; a coil on a secondary side; a transformer provided between the coil on the primary side and the coil on the secondary side for inducing a voltage to the secondary side including the coil and a rectifier on the secondary side when power of the input power supply is applied to the coil on the primary side; and a snubbed coil and a snubbed rectifier configured corresponding to the coil and the rectifier on the secondary side.

In accordance with another aspect of the present invention, an apparatus for controlling a surge voltage, includes: an input power supply; a transformer for inducting a voltage to a secondary side including a coil and a rectifier based on the input power supply and a coil on a primary side; and a snubbed circuit including a snubbed coil and a snubbed rectifier configured corresponding to the secondary side in order to solve a surge voltage generated when the rectifier on the secondary side is turned-off.

In accordance with still another aspect of the present invention, an apparatus for controlling a surge voltage, includes: an input power supply; a transformer for inducting a voltage to a secondary side including a plurality of coils and a plurality of rectifiers based on the input power supply and a coil on a primary side; and a snubbed circuit including a snubbed coil and a snubbed rectifier to be selectively operated in response to a surge voltage generated when one of the rectifiers on the secondary side is turned-off in order to solve the surge voltage.

In accordance with yet another aspect of the present invention, an apparatus for controlling a surge voltage in a converter, includes: an input power supply; a transformer for inducing a voltage on a primary side from the input power supply to a switching device on the secondary side including a plurality of coils and first and second rectifiers on the secondary side; a snubbed circuit including a plurality of snubbed coils and first and second snubbed rectifiers connected to the switching device on the secondary side.

Advantageous Effects of Invention

An embodiment as mentioned above can include a snubbed circuit being a combination of a coil and a snubbed rectifier corresponding to a coil and a rectifier being a secondary side circuit to prevent a device life due to heat generation of a resistor from being reduced.

When a rectifier configured in the secondary side circuit is turned-off, the embodiment can momentarily turn-on a snubbed rectifier of a snubbed circuit configured corresponding to the turned-off rectifier to control a surge voltage in a rectifier according to being turned-off.

Further, the present invention may control the number of coils to efficiently reduce a high surge voltage applied to a switching device on a secondary side, namely, a rectifier and control the high surface voltage to a desired level to improve characteristics of a device.

In the embodiment, both of coils and snubbed coils on a primary side and/or a secondary side may be wound around one core when a coil is wound around a core to reduce a cost and slim the size.

BRIEF DESCRIPTION OF DRAWINGS

The objects, features and advantages of the present invention will be more apparent from the following detailed description in conjunction with the accompanying drawings.

FIG. 3 is a circuit diagram illustrating a current direction in a secondary side operating in a current flow direction and a current direction in a snubbed circuit corresponding thereto during a reverse operation according to an exemplary embodiment of the present invention.

FIG. 4 is a circuit diagram illustrating a configuration of a converter including a half wave rectifier and a snubbed circuit corresponding to the half wave rectifier according to an exemplary embodiment of the present invention.

BEST MODE FOR CARRYING OUT THE INVENTION

Exemplary embodiments of the present invention are described with reference to the accompanying drawings in detail.

The same reference numbers are used throughout the drawings to refer to the same or like parts. Detailed descriptions of well-known functions and structures incorporated herein may be omitted to avoid obscuring the subject matter of the present invention.

In a description of an embodiment, a rectifier is used to perform full wave rectification through a switching operation during a forward operation and a reverse direction of alternating current (AC).

In the description of an embodiment, a winding wire and a coil are integrated as substantially the same element.

In the description of an embodiment, a forward direction is a flow direction of an electric current during a half period (0~180) of an AC, and a reverse direction a flow direction of an electric current during a half period (180~360) of the AC.

In the description of an embodiment, a snubbed rectifier includes a circuit arrangement or a circuit device for controlling a spike surge voltage generated when the rectifier is turned-off.

A case where components are connected to or linked to each other includes a case where the components are directly connected to or linked to each other, or a case where the component is connected to or linked to another component, another medium, another device in a mechanical scheme, an electric scheme, or a signal scheme or wired/wireless schemes.

Figure 1:
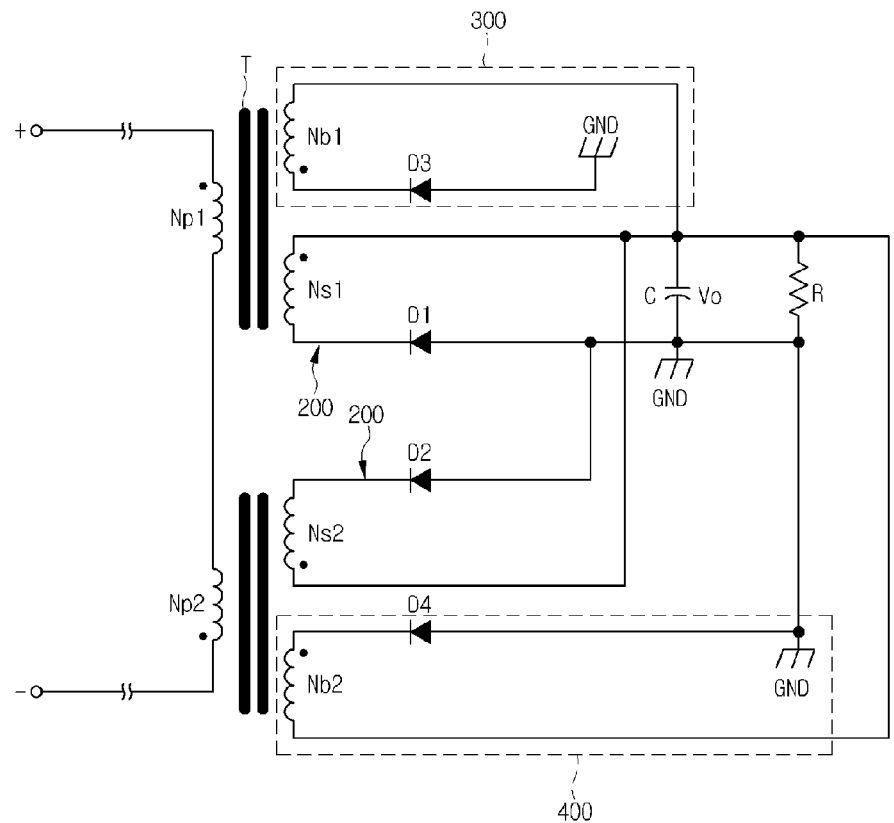
FIG. 1 is a circuit diagram illustrating a configuration of a converter including a full wave rectifier and a snubbed circuit corresponding to the full wave rectifier according to an exemplary embodiment of the present invention.

Here, an operation of this embodiment will be described with reference to the accompanying drawings. FIG. 1 is a circuit diagram illustrating a configuration of a converter including a full wave rectifier and a snubbed circuit corresponding to the full wave rectifier according to an exemplary embodiment of the present invention.

Figure 2:
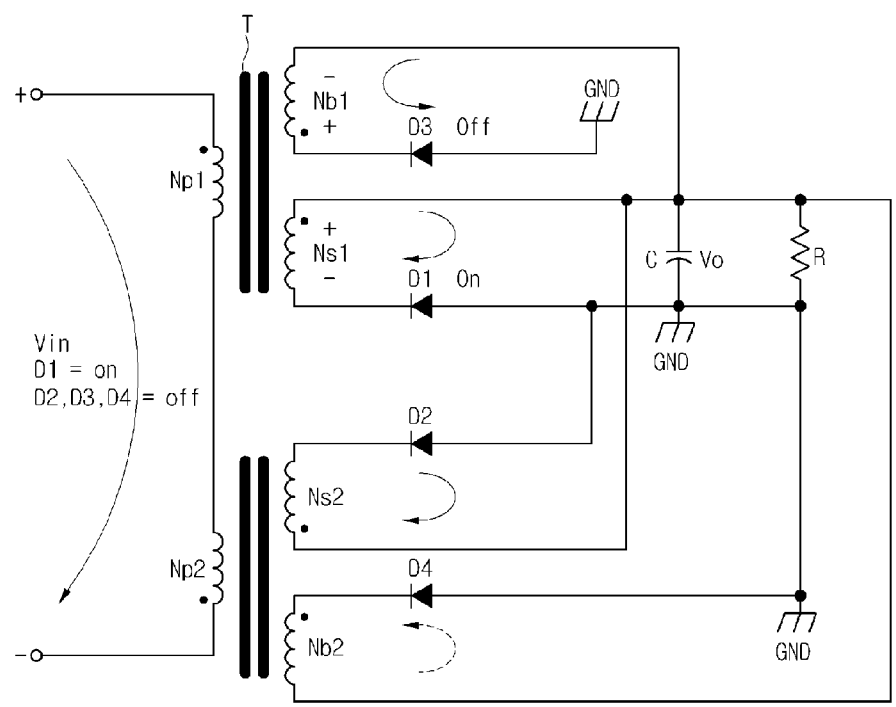
FIG. 2 is a circuit diagram illustrating a current direction in a secondary side operating in a current flow direction and a current direction in a snubbed circuit corresponding thereto during a forward operation according to an exemplary embodiment of the present invention.

FIG. 2 is a circuit diagram illustrating a current direction in a secondary side operating in a current flow direction and a current direction in a snubbed circuit corresponding thereto during a forward operation according to an exemplary embodiment of the present invention.

FIG. 3 is a circuit diagram illustrating a current direction in a secondary side operating in a current flow direction and a current direction in a snubbed circuit corresponding thereto during a reverse operation according to an exemplary embodiment of the present invention.

FIG. 4 is a circuit diagram illustrating a configuration of a converter including a half wave rectifier and a snubbed circuit corresponding to the half wave rectifier according to an exemplary embodiment of the present invention.

Figure 5:
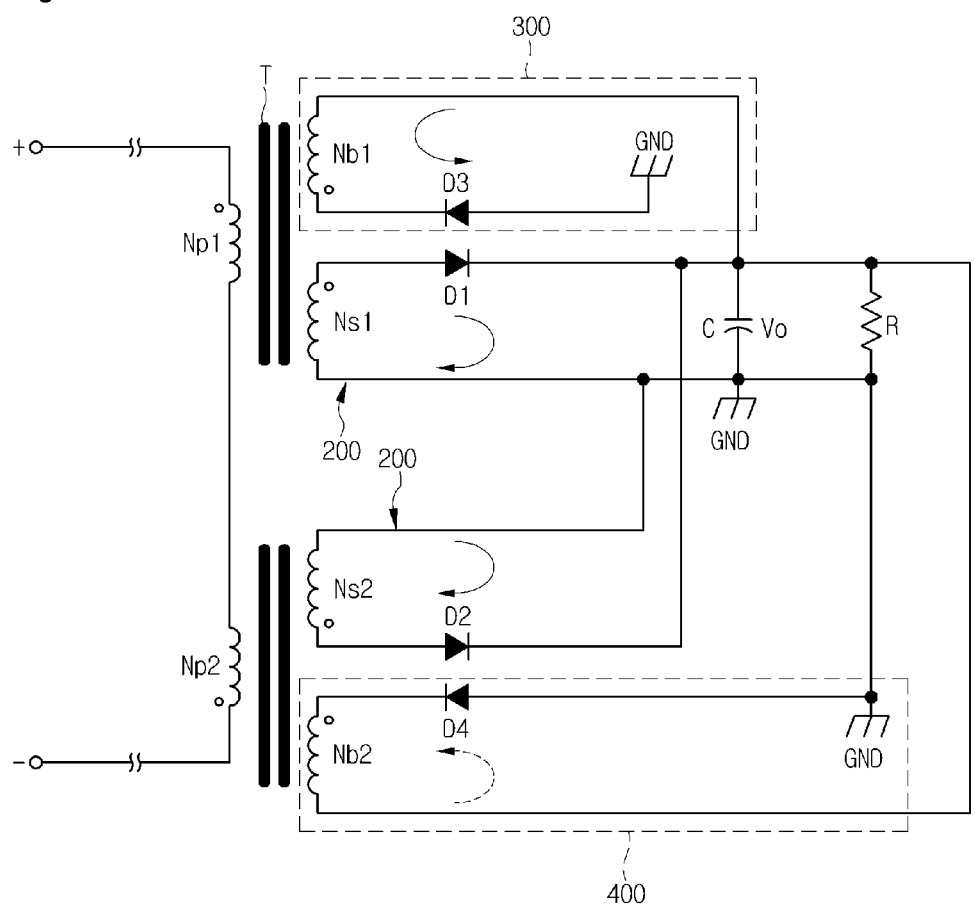
FIG. 5 is a circuit diagram illustrating a changed location of a rectifier on a secondary side.

FIG. 5 is a circuit diagram illustrating a changed location of a rectifier on a secondary side.

First, this embodiment will be generally described with reference to FIGS. 1 to 3.

As shown in FIGS. 1 and 2, during a forward current period, that is, when an upper side of an input voltage is + and a lower side of the input voltage is −, a first diode D1 is turned-on but a second diode D2 is turned-off in a full wave rectifier on a secondary side according to a transformer dot direction (polarization direction).

Furthermore, when a third diode D3 and a fourth diode D4 are turned-off, the fourth diode D4 is turned-off by force during a forward operation. Conversely, when the third diode D3 and the fourth diode D4 are turned-off, the third diode D3 is turned-off by force during a reverse operation.

Force turning-off the third diode D3 and the fourth diode D4 may be implemented by controlling the number of turns of corresponding snubber coils Nb1 and Nb2, which will be described below. The reason to turn-off the fourth diode D4 by force is that only snubber coils Np1 and Ns1 function as a main transformer Np and Ns. That is, the reason is because only snubber coils Np2 and Ns2 function as one transformer if the fourth diode D4 is not turned-off by force.

The foregoing matters are applicable to a method for turning-off the third diode D3 by force with the same reason.

Since the first diode D1 is turned-on, a voltage across the snubber coil Ns1 is an output voltage Vo. Accordingly, a voltage across the snubber coil Np1 is (Np/Ns)*Vo, and a voltage across the snubber coil Np2 is Vin−(Np/Ns)*Vo.

When a polarity of an input voltage changes, namely, during a revere operation, states of the voltage across the snubber coil Np1 and the voltage across the snubber coil Np2 are changed.

As shown in FIG. 3, when the first diode D1 shifts from an on state to an off state, a high spike voltage is applied across the first diode D1 due to leakage inductance of a transformer and the like.

To control the spike surge voltage, when the third diode D3 is momentarily turned-on in a case where the first diode D1 shifts an on state to an off state, the output voltage Vo is applied to the snubber coil Nb1. Because a voltage obtained by reflecting the voltage from the snubber coil Ns1 becomes (Ns1/Nb1)*Vo, and the first diode D1 is turned-off, a voltage across the first diode D1 becomes Vo+(Ns1/Nb1)*Vo=VD_max. When a VD_max value is set, a spike voltage across the first diode D1 may be controlled. When the spike voltage is equal to the output voltage Vo or within a preset range set by a user (for example, exceeds 10%), the third diode D3 is turned-off.

Because a voltage across a snubber coil Np1 is Vin−(Np2/Ns2)*Vo, a voltage obtained by reflecting the voltage across a snubber coil Np1 becomes (Nb1/Np1)*[Vin−(Np2/Ns2)*Vo]=(Nb1/Np1)*Vin−(Nb1/Ns2)*Vo. When the third diode D3 should be turned-off, (Nb1/Np1)*Vin−(Nb1/Ns2)*Vo]<Vo should be satisfied. If a corresponding equation is arranged, (Nb1/Np1)*Vin<[1+(Nb1/Ns2)]*Vo. If (Nb1/Np1)*Vin<[1+(Nb1/Ns2)]*Vo is rearranged, $(Ns1/Np1)Vin < [1+(Ns1/Nb1)*Vo] = VD\_max.$ Accordingly, when a VD_max value which a designer can permit in actual design is determined, a snubber coil Nb (Nb becomes Nb1 or Nb2 according to an operation situation) may be obtained based on an equation (Ns1/Np1)Vin<[1+(Ns1/Nb1)*Vo]=VD_max). Here, the Np and Ns are a main transformer, and are determined already in a circuit design, and a coil operating in FIG. 1 becomes Np or Ns.

Referring to FIG. 1, a converter according to this embodiment includes an AC input power supply Vin, a transformer T for inducing a primary side voltage from the AC input power supply Vin to a switching device 200 on a secondary side having coils Ns1 and Ns2 and full wave rectifiers D1 and D2 on the secondary side, and a snubber circuit 300 having a snubber coil Nb1 and a snubber rectifier D3 connected to the switching device 200 on the secondary side in series.

Coils Np1 and Np2 on a primary side are connected with both terminals of the AC input power supply Vin, respectively, and a switching device (not shown) may be connected between the AC input power supply Vin and the coils Np1 and Np2 on the primary side.

The switching device may be configured by combining a plurality of switches in series and parallel, which may be a power MOSFET.

Further, the switching device may further a protection diode having internal capacitance the source and the drain and using a direction from a source to a drain as a forward direction.

Moreover, a gate serving as a control terminal may be connected to a control circuit.

Coils Ns1 and Ns2 on the secondary side may be provided at another terminal of the transformer T such that a voltage is induced in the coils Np1 and Np2 on the primary side.

In the meantime, as illustrated in FIG. 4, a technical idea of this embodiment is applicable to a single module.

Rectifier diodes, for example, a first diode D1 and a second diode D2 are connected to the coils Ns1 and Ns2 on the secondary side in series, and a capacitor C and a resistor R are connected to the first diode D1 and the second diode D2 in parallel.

Referring to FIGS. 1 and 2, when an input voltage from an power supply Vin is applied in a forward direction, the first diode D1 in the coil Ns1 on the secondary side with respect to the first coil Np1 generates a forward voltage. Accordingly, an electric current flows through a path composed of a coil Ns1 on the secondary side with respect to the first coil, a load side, and a coil Ns1 on the secondary side with respect to the first coil. In this case, the electric current may be increased according to the time.

After that, when the input power Vin is not applied, the electric current flow through the path but the electric current is reduced according to the time.

In the meantime, as shown in FIGS. 1 and 3, when the AC input voltage Vin is applied in a reverse direction, a second diode D2 in the coil Ns2 on the secondary side with respect to the second coil Np2 generates a forward voltage. Accordingly, an electric current through the first diode D1 rapidly becomes zero, and flows through a path composed of a coil Ns2 on the secondary side with respect to the second coil, a load R, the second diode D2, and a coil Ns2 on the secondary side. Next, as illustrated above, the flow of the electric current repeats.

During the foregoing operation, the electric current flowing through the first diode D1 does not stop when a forward current becomes zero, but an electric current (reverse recovery current) flows in a forward direction. The reverse recovery current flows through a short circuit path composed of the first diode D1, the coil Ns1 on the secondary side, a coil Ns2 of the secondary side with respect to the second coil, the second diode D2, and the first diode D1.

Because the foregoing reverse recovery current rapidly stops, a surge voltage is generated in the coil Ns1 on the secondary side with respect to the first coil, and the reverse recovery current is supplied to the first diode D1 in a reverse direction.

A forward voltage drop is increased in the first diode D1 having high internal pressure to endure the foregoing surge voltage. If the forward voltage drop is increased, loss is increased when the electric current flows in a forward direction, and accordingly conversion efficiency is reduced and heat is generated.

Accordingly, to absorb the surge voltage, snubber circuits 300 and 400 according to an embodiment of the present invention may be provided. One of the snubber circuits 300 and 400 will be described by way of example.

The snubber circuit 300 may be a circuit including a snubber coil Nb1 and a snubber diode D3.

The snubber coil Nb1 may be arranged in one side of a transformer T parallel with another side of the transformer, for example, a coil Ns1 on a secondary side with respect to a first coil.

The number of snubber coils Nb1 may be determined according to an input voltage Vin, an output voltage Vo, a coil Np1 on a primary side, and a coil Ns1 on a secondary side, and may be suitably controlled to obtain maximum efficiency.

When the input power Vin is applied in a forward direction, the first diode D1 is turned-on. In this case, the second diode D2 and snubber diodes D3 and D4 are turned-off.

When a polarity of the input voltage Vin is changed, the first diode D1 shifts from a turning-on state to a turning-off state, and a high surge voltage is applied across the first diode D1.

When the first diode D1 is turned-off, the snubber diode D3 is turned-on, and an output voltage Vo is applied across the snubber diode D3.

Accordingly, a voltage expressed by equation 1 may be applied to a coil Ns1 on the secondary side with respect to a first coil $$V_O \times \frac{Ns1}{Nb1} \qquad \text{[Equation 1]}$$

When the first diode D1 is turned-off, because a Vo voltage is applied across the first diode D1 already, a total voltage VD_max applied across the first diode D1 may be determined by a following equation 2.

$$V_O + V_O \times \left(\frac{Ns1}{Nb1}\right) = \left(1 + \frac{Ns1}{Nb1}\right)V_O = VD\text{max} \qquad \text{[Equation 2]}$$

In this case, when the moment elapses that the surge voltage is applied, a voltage expressed by a following equation 3 is applied across a coil Np1 on the primary side.

$$V_{IN} - V_O \times \left(\frac{Np2}{Ns2}\right) \qquad \text{[Equation 3]}$$

Accordingly, when the voltage $$V_{IN} - V_O \times \left(\frac{Ns2}{Nb2}\right)$$

is applied, a voltage expressed by a following equation 4 is applied across the snubber diode D3.

$$\left(\frac{Nb1}{Np1}\right) \times \left[V_{IN} - V_O \times \left(\frac{Np2}{Ns2}\right)\right] = V_{IN} \times \left(\frac{Nb1}{Np1}\right) - V_O \times \left(\frac{Nb1}{Ns1}\right) \qquad \text{[Equation 4]}$$

In this case, because the snubber diode D3 is turned-off, a following equation 5 may be satisfied.

$$V_{IN} \times \left(\frac{Nb1}{Np1}\right) - V_O \times \left(\frac{Nb1}{Ns1}\right) < V_O \qquad \text{[Equation 5]}$$

In the equation 5, since the present invention sets that Np1=Np2=Np, Ns1=Ns2=Ns, and Nb1=Nb2=Nb, the Ns2 may be substituted for the Ns1.

Accordingly, since the input voltage Vin, a coil Np1 value on the primary side, a coil Ns1 value on the secondary side, and an output voltage Vo are known, if a total voltage VD_max is set to a desired value, a snubber coil Nb1 value may be obtained from the equation 2.

Accordingly, the snubber circuit 300 according to the present invention may reduce a high surge voltage applied across a switching device on the secondary side and control the high surge voltage to a desired level, thereby improving characteristics of a device.

In the same manner, when the second diode D2 shifts from a turning-on state to a turning-off state, it may turn-on a snubber diode D4 of the snubber circuit 400 to reduce a voltage applied across the second diode D2.

In the embodiment, Np1=Np2 and Ns1=Ns2, and an operating device becomes a main transformer Np and Ns.

The embodiment of the present invention as described above will be explained by various methods.

A snubber circuit of the embodiment includes an input power supply; a transformer for inducing a voltage to a secondary side having a plurality of coils Ns1 and Ns2 and a plurality of rectifiers D1 and D2 based on the input power supply and a coil on a primary side; and snubber coils Nb1 and Nb2 and snubber rectifiers D3 and D4 provided on the secondary side to be selectively operated in response to a surge voltage generated when one of a plurality of rectifiers D1 and D2 is turned-off in order to solve the surge voltage.

The rectifiers and the snubber rectifiers provided on the secondary side may be connected to each other in series. Further, when the rectifiers D1 and D2 shift from an on state to an off state, so reduce a surge voltage generated in the rectifiers, snubber rectifiers D3 and D4 configured corresponding to the rectifiers D1 and D2 are turned-on for a predetermined time. The predetermined time when the snubber rectifiers D3 and D4 are turned-on is determined based on circuits including the D1 and D2 service as a switch and a snubber coil.

Moreover, when a forward current is switched to a reverse current, the D1 is turned-off but the D3 is momentarily turned-on.

Conversely, when the reverse current is switched to the forward current, the D2 is turned-off but the D4 is momentarily turned-on.

The ratio of turns in the snubber coil Nb1 is controlled such that a snubber rectifier D3 is turned-on when a voltage across the snubber coil Nb1 is greater than an output voltage Vo.

The ratio of turns in the snubber coil Nb1 is controlled such that a snubber rectifier D3 is turned-on when a voltage in the snubber coil Nb1 is (Nb1/Np1)*Vin−(Nb1/Ns2)*Vo]>Vo, where, the Np1 indicates the primary coil, the Vin indicated input power, and the Ns2 indicates a coil on the secondary side.

The ratio of turns in the snubber coil Nb1 is controlled such that the snubber rectifier D3 is turned-off when (Nb1/Np1)*Vin−(Nb1/Ns2)*Vo]<Vo, (Nb1/Np1)*Vin<[1+(Nb1/Ns2)]*Vo, or (Ns1/Np1)Vin<[1+(Ns1/Nb1)*Vo]=VD_max, where, the Np1 indicates a coil on a primary side, the Vin indicates input power, the Ns2 indicates a coil value on a secondary side, and the VDmax is set by the user.

The ratio of turns in the snubber coil Nb2 is controlled such that the snubber rectifier D4 is turned-on when a voltage in the snubber coil Nb2 is greater than the output voltage Vo.

In a case where the rectifier D1 on the secondary side shifts from an on state to an off state, when the snubber rectifier D3 is turned-on, the output voltage Vo is applied to the snubber coil Nb1. Since a voltage obtained by reflecting the voltage from the coil Ns1 becomes (Ns1/Nb1)*Vo and the D1 is turned-off, a voltage across the D1 becomes Vo+(Ns1/Nb1)*Vo=VD_max. When the VD_max is set, a spike surge voltage across the D1 may be controlled. When the spike voltage is within a range set by the user or is identical with at least output voltage Vo, the D3 is turned-off.

The rectifiers D1 and D2 provided on the secondary side function as a full wave rectifier. In the embodiment, rectifiers D1 and D2 provided on the secondary side is applicable as a single module such as a half wave rectifier.

In the embodiment, although the snubber circuit only includes a coil on a primary side, a coil on a secondary side, a snubber coil organically operating, a rectifier provided on a secondary side, and a snubber rectifier adversely operating, the present invention is not limited thereto.

Further, wherein the snubber circuit only includes a snubber coil organically operating with a coil on a primary side and a coil on a secondary side, and a snubber rectifier which is adversely operating with a rectifier provided on a secondary side.

In the embodiment, a rectifier D1 being turned-on during a forward current time period of a primary side and a rectifier D3 being momentarily turned-on when a reverse current of the primary side flows are provided in series on a secondary side.

In the embodiment, a rectifier D1 being turned-on during a forward current time period of a primary side and a snubber rectifier D3 being momentarily turned-on when a forward current of the primary side is switched are provided in series on a secondary side.

In the embodiment, a rectifier D2 being turned-on during a forward current time period of a primary side and a rectifier D4 being momentarily turned-on when a forward current of the primary side flows are provided in series on a secondary side.

In the embodiment, a rectifier D1 being turned-on and a second rectifier D2 being turned-off during a forward current time period are provided on the secondary side, and first and second snubber rectifiers D3 and D4 corresponding to the rectifiers D1 and D3 are provided in series, respectively. When the rectifier D1 is turned-on according to a forward current, the second rectifier D2, first and second snubber rectifiers D3 and D4 are turned-off.

In the embodiment, a second rectifier D2 being turned-on and a first rectifier D1 being turned-off during a reverse current time period are provided on the secondary side, and first and second snubber rectifiers D3 and D4 corresponding to the first rectifier D1 and the first snubber rectifier D3 are provided in series, respectively. When the rectifier D2 is turned-on according to a reverse current, the rectifiers D1, D3, and D4 are turned-off.

In the embodiment, each coil on the secondary side and a snubber coil on the secondary side are integrated with one core and wound around it.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The embodiment may be used to control a surge voltage generated by a transformer and rectifiers.

The embodiment is applicable to various circuits including at least one coil, at least one rectifier, and snubber coils and snubber rectifiers corresponding thereto.

The invention claimed is:

1. An apparatus for controlling a surge voltage, comprising:
an input power supply;
a transformer which is configured to induce a voltage on a secondary side from a primary side based on the input power supply, wherein the primary side includes a plurality of primary coils (Np1-Npn, where n is a positive integer), and the secondary side includes a plurality of secondary coils (Ns1-Nsn, where n is a positive integer) and a plurality of rectifiers; and
a snubber circuit which includes a plurality of snubber coils (Nb1-Nbn, where n is a positive integer) and a plurality of snubber rectifiers, the plurality of snubber coils being configured to respectively correspond to the plurality of secondary coils on the secondary side of the transformer, and the plurality of snubber rectifiers being configured to respectively correspond to the plurality of rectifiers on the secondary side of the transformer,
wherein the plurality of snubber coils are organically operating with the plurality of primary coils on the primary side of the transformer and the plurality of secondary coils on the secondary side of the transformer.

2. The apparatus of claim 1, wherein the rectifier and the snubber rectifier, which are provided on the secondary side of the transformer, are connected in series to each other.

3. The apparatus of claim 2, wherein each of the snubber rectifiers configured to respectively correspond to each of the rectifiers is turned on for a predetermined time in order to reduce a surge voltage generated by each of the rectifiers when each of the rectifiers is switched from on to off.

4. The apparatus of claim 3, wherein in a case where one (D1) of the rectifiers on the secondary side of the transformer is turned off, one (D3) of the snubber rectifiers, which is configured to correspond to the rectifier (D1) on the secondary side of the transformer, is momentarily turned on when a forward current is switched to a reverse current.

5. The apparatus of claim 3, wherein another (D2) of the rectifiers on the secondary side of the transformer is turned off and another (D4) of the snubber rectifiers, which is configured to correspond to the other rectifier (D2) on the secondary side of the transformer, is momentarily turned on when a reverse current is switched to a forward current.

6. The apparatus of claim 3, wherein a ratio of turns in one snubber coil (Nb1) of the snubber coils is controlled such that the snubber rectifier (D3) connected in series to the snubber coil (Nb1) is turned on when a voltage in the snubber coil (Nb1) is greater than an output voltage (Vo) on the secondary side.

7. The apparatus of claim 6,
wherein the ratio of turns in the snubber coil (Nb1) is controlled such that the snubber rectifier (D3) is turned on when a voltage in the snubber coil (Nb1) is:

$(Nb1/Np1)*Vin-(Nb1/Ns2)*Vo]>Vo$, where Nb1 indicates a snubber coil, Np1 indicates a primary coil, Vin indicates an input voltage of the input power supply, Ns2 indicates a secondary coil on the secondary side, and Vo indicates an output voltage on the secondary side.

8. The apparatus of claim 6,
wherein the ratio of turns in the snubber coil (Nb1) is controlled such that the snubber rectifier (D3) is turned off when a voltage in the snubber coil (Nb1) is at least one of:

$(Nb1/Np1)*Vin-(Nb1/Ns2)*Vo]<Vo$, $(Nb1/Np1)*Vin<[1+(Nb1/Ns2)]*Vo$, and $(Ns1/Np1)*Vin<[1+(Ns1/Nb1)*Vo]=VD\_max$, where Nb1 indicates a snubber coil, Np1 indicates a primary coil, Vin indicates an input voltage of the input power supply, Ns2 indicates a secondary coil on the secondary side, Vo indicates an output voltage on the secondary side, and VD_max is a voltage set by a user.

9. The apparatus of claim 3, wherein a ratio of turns in one snubber coil (Nb2) of the snubber coils is controlled such that the snubber rectifier (D4) connected in series to the snubber coil (Nb2) is turned on when a voltage in the snubber coil (Nb2) is greater than the output voltage (Vo) on the secondary side.

10. The apparatus of claim 6,
wherein in a case where one rectifier (D1) of the rectifiers on the secondary side is switched from on to off, when the snubber rectifier (D3) configured to correspond to the rectifier (D1) is turned on, the output voltage (Vo) is applied to the snubber coil (Nb1), a voltage which the output voltage is reflected to the secondary coil (Ns1) is (Ns1/Nb1)*Vo, and a voltage across the rectifier (D1) becomes Vo+(Ns1/Nb1)*Vo=VD_max since the rectifier (D1) is turned off, and
wherein a spike surge voltage across the rectifier (D1) is controlled when the VD_max is set by a user, and the snubber rectifier (D3) is turned off when the spike surge voltage is within a range set by the user or at least equal to the output voltage (Vo).

11. The apparatus of claim 1, wherein each of the rectifiers on the secondary side is a single module such as a half wave rectifier.

12. An apparatus for controlling a surge voltage, comprising:
   an input power supply;
   a transformer which is configured to induce a voltage on a secondary side from a primary side based on the input power supply, wherein the primary side includes a first primary coil and a second primary coil, and the secondary side includes a first secondary coil, a second secondary coil, a first rectifier, and a second rectifier; and
   a snubber circuit including a first snubber coil, a second snubber coil, a first snubber rectifier, and a second snubber rectifier, which is connected to the secondary side of the transformer,
   wherein the first snubber coil is organically operating with the first primary coil on the primary side of the transformer and the first secondary coil on the secondary side of the transformer.

13. The apparatus of claim 12,
   wherein the secondary side includes the first rectifier being turned on during a forward current time period on the primary side, and the first snubber rectifier being momentarily turned on according to a reverse current on the primary side, and
   wherein the first rectifier and the first snubber rectifier are connected in series to each other.

14. The apparatus of claim 12,
   wherein the secondary side includes the first rectifier being turned on during a forward current time period on the primary side, and the first snubber rectifier being momentarily turned on on the secondary side when a forward current on the primary side is switched, and
   wherein the first rectifier and the first snubber rectifier are connected in series to each other.

15. The apparatus of claim 12,
   wherein the secondary side includes the second rectifier being turned on during a reverse current time period on the primary side, and the second snubber rectifier being momentarily turned on according to a forward current on the primary side, and
   wherein the second rectifier and the second snubber rectifier are connected in series to each other.

16. The apparatus of claim 12,
   wherein the first rectifier being turned on and the second rectifier being turned off during a forward current time period on the primary side are provided on the secondary side, and the first and second snubber rectifiers configured to respectively correspond to the first and second rectifiers are provided in series, respectively, and
   wherein the second rectifier and the first and second snubber rectifiers are turned off when the first rectifier is turned on according to a forward current.

17. The apparatus of claim 12,
   wherein the second rectifier being turned on and the first rectifier being turned off during a reverse current time period on the primary side are provided on the secondary side, and the first and second snubber rectifiers configured to respectively correspond to the first and second rectifiers are provided in series, respectively, and
   wherein the first rectifier and the first and second snubber rectifiers are turned off when the second rectifier is turned on according to a reverse current.

* * * * *